US008000724B1

(12) United States Patent  (10) Patent No.: US 8,000,724 B1
Rayburn et al.  (45) Date of Patent: Aug. 16, 2011

(54) METHOD AND SYSTEM FOR SUBNET-BASED TRANSMISSION OF MOBILE STATION LOCATION

(75) Inventors: Terry Rayburn, Kansas City, MO (US); Michael P. McMullen, Prairie Village, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 2663 days.

(21) Appl. No.: 10/265,980

(22) Filed: Oct. 7, 2002

Related U.S. Application Data

(63) Continuation-in-part of application No. 09/993,007, filed on Nov. 14, 2001.

(51) Int. Cl.
*H04W 24/00* (2009.01)
(52) U.S. Cl. .............. 455/456.3; 455/456.1; 455/456.2; 455/456.4; 455/456.5; 455/456.6; 455/414.1; 455/518; 455/519; 370/310; 370/338; 370/352; 370/356
(58) Field of Classification Search .................. 455/518, 455/519, 508, 456.1, 457, 456.4, 456.2, 412.2, 455/412.1, 414.1, 456.3, 456.5, 456.6, 41.2; 370/329, 432, 310, 338, 352, 356; 709/201
See application file for complete search history.

(56) References Cited

U.S. PATENT DOCUMENTS

| | | | |
|---|---|---|---|
| 6,304,556 B1 * | 10/2001 | Haas | 370/254 |
| 6,369,705 B1 * | 4/2002 | Kennedy | 340/506 |
| 6,504,503 B1 | 1/2003 | Saint-Hilaire et al. | |
| 6,542,750 B2 * | 4/2003 | Hendrey et al. | 455/456.1 |
| 6,681,108 B1 * | 1/2004 | Terry et al. | 455/412.2 |
| 6,954,790 B2 * | 10/2005 | Forslow | 709/227 |
| 7,136,645 B2 * | 11/2006 | Hanson et al. | 455/435.1 |
| 2001/0041576 A1 * | 11/2001 | I'Anson et al. | 455/456 |
| 2002/0007414 A1 * | 1/2002 | Inoue et al. | 709/230 |
| 2002/0077080 A1 * | 6/2002 | Greene | 455/412 |
| 2002/0119788 A1 * | 8/2002 | Parupudi et al. | 455/456 |
| 2003/0087646 A1 * | 5/2003 | Funato et al. | 455/456 |

OTHER PUBLICATIONS

Invertix Corporation IM Anywhere Privacy Management System, http://www.invertix.com/products_features_privacymanagement.html, printed from the World Wide Web on Aug. 14, 2001.
Invertix Corporation IM Anywhere Mobile Buddy List Features, http://www.invertix.com/products_features_mobilebuddylist.html, printed from the World Wide Web on Aug. 14, 2001.
Followap Telecommunications, iFollow Products Family, http://www.followap.com/shtm/ifollow_main.shtml, printed from the World Wide Web on Aug. 14, 2001.

(Continued)

*Primary Examiner* — Olumide T Ajibade Akonai

(57) ABSTRACT

A method and system for reporting mobile subscriber location is disclosed. Upon receipt of a request to report the location of a given mobile subscriber, a server may identify the subscriber's "buddies" and then determine, for each buddy, whether the buddy is located in the same zone as the given subscriber. The zone may be, for example, a subnet of a network. Additionally, the server may determine whether a rule is set to block reporting of the given subscriber's location to the buddy. Provided that the buddy is located in the same zone as the given subscriber and provided that reporting is allowed, the server may then send a location-reporting message to the buddy, indicating the given subscriber's location, preferably in terms of proximity to the buddy. The server may further receive a reply from the buddy and then send a location-reporting reply message to the given subscriber, indicating the location of the buddy.

21 Claims, 4 Drawing Sheets

OTHER PUBLICATIONS

Wireless Developer Network, Addition of Location Management to Wireless IM Set to Drive GPRS Adoption, http://www.wirelessdevnet.com/news/2001/23/news2.html, printed from the World Wide Web on Aug. 14, 2001.

GartnerGroup, Yahoo!Find-a-Friend: Wireless or Borderless Privacy? http://gartner11.gartnerweb.com/public/static/hotc/hc00088645.html, printed from the World Wide Web on Sep. 6, 2001.

Ericsson, www.telecomcorridor.com/wireless%20horizons/1Coyne.pdf, printed from the World Wide Web on Jun. 27, 2001.

Office Action mailed Jul. 9, 2004.

Office Action mailed Mar. 6, 2008.

Office Action mailed Sep. 18, 2008.

* cited by examiner

METHOD AND SYSTEM FOR SUBNET-BASED TRANSMISSION OF MOBILE STATION LOCATION

RELATED APPLICATIONS

The present application is a continuation-in-part of U.S. patent application Ser. No. 09/993,007, filed Nov. 14, 2001, for "Method and System for Zone-based Transmission of Mobile Station Location," which is assigned to the same assignee as the present application.

BACKGROUND OF THE INVENTION

1. Field of the Invention

The present invention relates to mobile communications and, more particularly, to reporting of mobile station location.

2. Description of Related Art

Cellular wireless is an increasingly popular means of personal communication in the modern world. People are using cellular wireless networks for the exchange of voice and data over cellular telephones, Personal Digital Assistants ("PDAs"), cellular telephone modems, and other devices. In principle, a user can seek information over the Internet or call anyone over a Public Switched Telephone Network ("PSTN") from any place inside the coverage area of the cellular wireless network.

An important feature of contemporary cellular wireless networks is an ability to locate the geographical position of a mobile station. Such a feature was developed initially to assist emergency services in locating a mobile station. For example, in the United States, the Federal Communications Commission ("FCC") has mandated the implementation of "Enhanced 911" ("E911") services.

The E911 mandate was divided into two phases. According to Phase 1, the location must be identified with an accuracy of at least cell and sector. As this information is typically maintained by a wireless cellular carrier in a subscriber's home location register ("HLR"), Phase 1 presents little technical challenge. According to Phase 2, the location must be provided with an accuracy of at least 100 meters (or 50 meters for handset-originated methods such as GPS), which is far more granular than the cell and sector information maintained in the HLR. In response, the Telecommunications Industry Association (TIA) has proposed a new standard for "Enhanced Wireless 9-1-1, Phase 2," now entitled "Wireless Enhanced Emergency Services" or "TIA/EIA/IS-J-STD-036" (J-STD-036), the entirety of which is hereby incorporated by reference.

In order to achieve the accuracy specified by Phase 2, a cellular wireless network may employ a special position determining entity ("PDE") and techniques. Alternatively, a mobile station itself may employ a position determining system such as global position satellite (GPS) system and may relay its position to the network, for reference by the emergency services. The emergency services may then use the position of the mobile station to help assist a user of the mobile station.

SUMMARY

The present invention provides a mechanism for reporting the location of a mobile subscriber. According to an exemplary embodiment of the invention, a wireless carrier will receive a request from a mobile subscriber ("requesting subscriber") and will responsively report the requesting subscriber's location to one or more other mobile subscribers ("receiving subscribers"), provided that the receiving subscribers are located in the same "zone" as the requesting subscriber. The zone can be a cell, sector or some other designated location or area such as a building or a sports stadium for instance. Alternatively, the zone can be defined with respect to the requesting subscriber, such as an area covering a predefined distance from the subscriber. And still alternatively, the zone can be defined by a subnet of a network.

The request to report location may itself identify the one or more other subscribers to which the requesting subscriber's location might be reported. Or, alternatively, the request might not identify the one or more other subscribers, in which case the wireless carrier may identify the one or more other subscribers by reference to a database of predefined groupings (such as groups keyed to requesting subscribers).

The requesting subscriber's "location" that the wireless carrier reports is preferably an indication of the requesting subscriber's proximity to the receiving subscriber. For instance, the wireless carrier may report that the requesting subscriber is "nearby" or "close" to the receiving subscriber or that the requesting subscriber is in a location in common with the receiving subscriber. Being connected to a common subnet can mean that two subscribers are proximate to each other.

Further, or alternatively, the wireless carrier can report the requesting subscriber's location more specifically, such as by (i) specific latitude/longitude coordinates, (ii) a specific street address, (iii) an identity of an establishment where the requesting subscriber is located, (iv) a map showing where the requesting subscriber is located, (v) a compass heading and distance, cooperatively indicating where the requesting subscriber is located in relation to the receiving subscriber, and/or (vi) a subnet location. The subnet location may be the subnet address. Alternatively, the subnet location may be specific latitude/longitude coordinates, address, identity of an establishment, map, and/or a compass heading and distance indicating the location of the one or more devices on the subnet.

In the exemplary embodiment, once a receiving subscriber receives the report of another subscriber's location, the receiving subscriber may then reply to the requesting subscriber with an acknowledgement, which may also provide an indication of the receiving subscriber's location, again preferably as an indication of proximity. For instance, the receiving subscriber may direct the wireless carrier to send a reply to the requesting subscriber. And the wireless carrier may then responsively send to the requesting subscriber a message indicating that the receiving subscriber is "nearby" or "here" or the like. As with the requesting subscriber, the reply from the receiving subscriber may alternatively or additionally indicate the receiving subscribers location more specifically.

According to another aspect of the exemplary embodiment, a mechanism can be provided to block the reporting of a given mobile subscriber's location to another mobile subscriber. For instance, the wireless carrier can maintain or access logic indicating that the wireless carrier should not report any subscriber's location to a given receiving subscriber, or that the wireless carrier should not report a specific subscriber's location to the receiving subscriber.

The logic could list those subscribers whose locations should not be reported to the receiving subscriber. In that case, if a requesting subscriber is listed, the wireless carrier will not report that requesting subscriber's location to the receiving subscriber. Alternatively, the logic could list those subscribers whose location can be reported to the receiving subscriber. (For instance, this could be a predefined group of subscribers associated with the receiving subscriber.) In that case, if the requesting subscriber is not listed on the list, then the wireless carrier will not report that requesting subscriber's location to the receiving subscriber.

With the benefit of the present invention, a requesting mobile subscriber can thus alert one or more other subscribers that the requesting subscriber is nearby them. Further, by receiving an acknowledgement and/or location report in response from a receiving subscriber, the requesting subscriber can learn that the receiving subscriber is also nearby.

For example, when a mobile subscriber is at a football stadium (an example "zone"), the subscriber may send a request message to the wireless carrier, and the wireless carrier may responsively look up a list of the subscriber's "buddies" and report the subscriber's location to those buddies who are also in the football stadium. In turn, each buddy can acknowledge the location report, and the wireless carrier can send to the mobile subscriber an indication that the buddy is nearby.

These as well as other aspects and advantages of the present invention will become apparent to those of ordinary skill in the art by reading the following detailed description, with appropriate reference to the accompanying drawings.

BRIEF DESCRIPTION OF THE DRAWINGS

An exemplary embodiment of the present invention is described herein with reference to the drawings, in which.

DETAILED DESCRIPTION OF EXEMPLARY EMBODIMENTS

Figure 1:
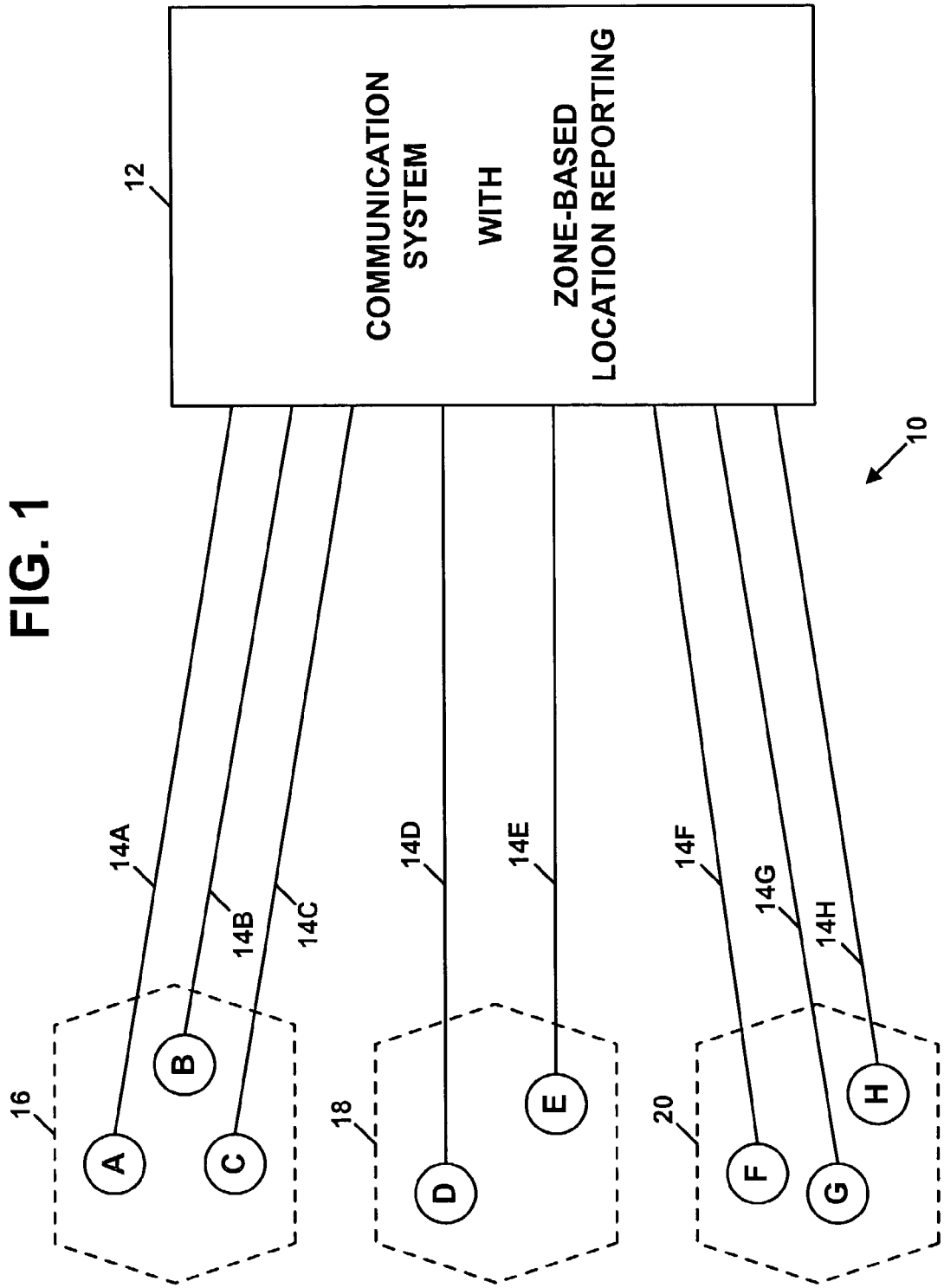
FIG. 1 is a block diagram of a network arranged in accordance with the exemplary embodiment.

Referring to the drawings, FIG. 1 is a block diagram generally depicting a communications network 10 arranged in accordance with an exemplary embodiment of the invention. Network 10 includes at its core a communication system 12, which provides for zone-based reporting of location. A plurality of mobile subscriber terminals may then be coupled by respective communication links 14A-14H with system 12. By way of example, eight such terminals are shown, designated respectively by the letters A-H.

FIG. 1 further depicts three zones, designated by reference numerals 16, 18, and 20. Terminals A-C are shown located in (e.g., operating in) zone 16, terminals D-E are shown located in zone 18, and terminals F-H are shown located in zone 20. Although these zones are illustrated as discrete (non-overlapping) areas, they could just as well overlap each other or, for that matter, be coterminous.

Each zone could be defined in various ways. For example, a zone could be a particular geographic area, defined as a polygon comprised of nodes having specific geographic coordinates (latitude/longitude coordinates). As another example, a zone could be a particular enclosure such as a building or floor of a building, defined by the walls of the enclosure. As yet another example, a zone could be service area in a wireless communication system, such a radio-frequency cell or sector thereof, defined by a radiation pattern from a base station antenna. And as yet another example, as noted above, a zone could be defined as the area extending out a predefined distance from a given subscriber.

And as still another example, a zone could be defined as a subnet, which could cover all subscriber terminals on the same subnet. A network can be split into several subnets for internal use. Externally, the subnets are perceived as being part of a single network. By using subnets, the network can expand without obtaining new network addresses, which makes system management easier. A subnet may include one or more devices with the same subnet address.

For example, a network switch may be used for an entire metropolitan area, while a subnet switch may be used for just a portion of the metropolitan area. Alternatively, the subnet switch may be used for just a cell sector within the metropolitan area. In this example, the size of the subnet zone may depend on the size of the metropolitan area or the size of the cell sector. Other methods of dividing the network into subnets are also possible.

Mobile subscriber terminals A-H can also take any of a variety of forms and can be the same as each other or different than each other. Examples of suitable terminals include (i) cellular or PCS telephones, PC cards or data terminals (e.g., wireless web devices such as the RIM Blackberry or the Palm VII personal digital assistant), wireless local area network stations (e.g., stations that are compliant with industry standard 802.11b), and satellite communication terminals. Other examples are possible as well.

Links 14A-14H, similarly, can take any of a variety of forms and can also be the same as or different than each other. Further, each link could comprise various elements, such as wired or wireless connections, direct end-to-end connections, and one or more transport networks, whether packet-switched or circuit-switched, and each link could operate according to any of a variety of protocols. Additionally, some or all of the links could be combined together at least in part. For instance, links 14A and 14B might be physically connected through a common access network/gateway and via a common transport network to communication server 12. Many other examples are also possible.

Communication system 12, in turn, can also take a variety of forms. As a general matter, communication system 12 functions to receive a location-reporting request from a subscriber terminal and to responsively report the subscriber's location to one or more other subscriber terminals, provided that those one or more other subscriber terminals are located in the same zone as the requesting subscriber. Further, communication system 12 may function to provide acknowledgement(s) to the requesting subscriber, so that the requesting subscriber can learn that one or more of the receiving subscriber terminals are nearby.

Figure 2:
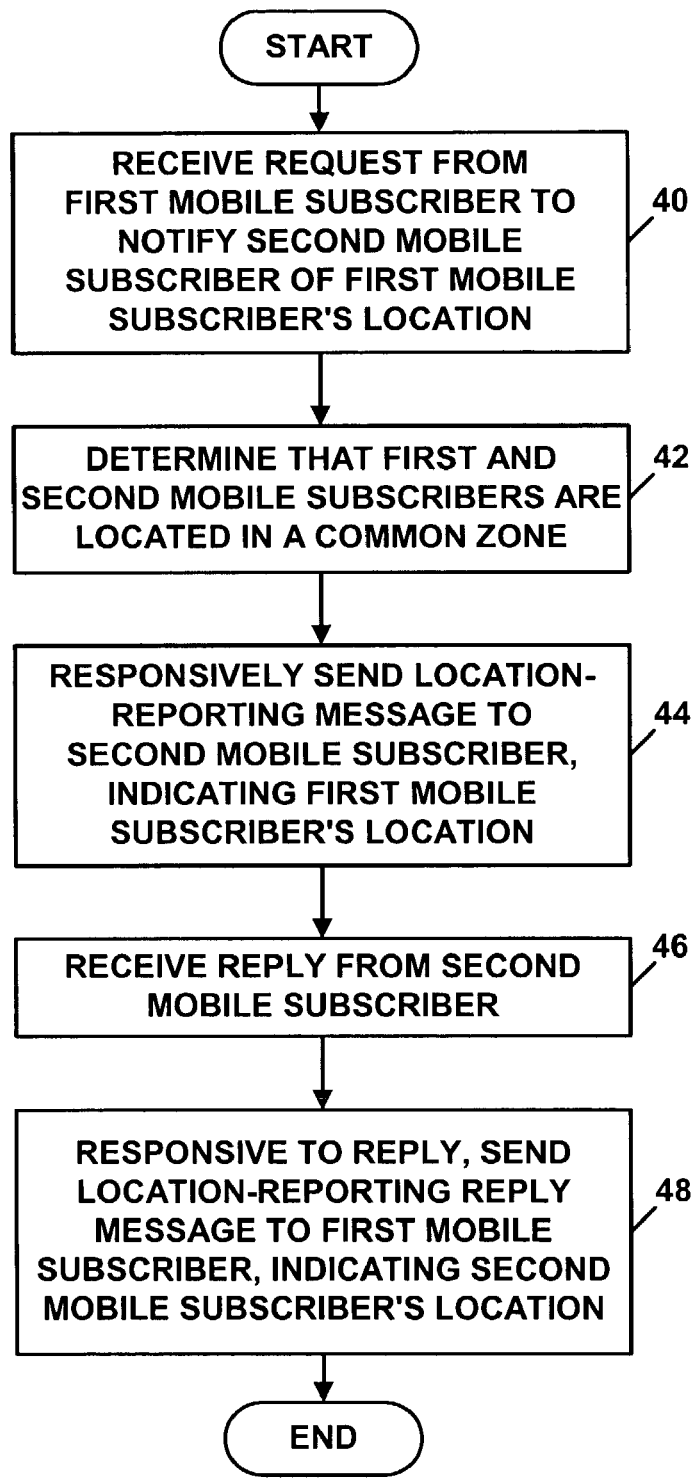
FIG. 2 is a flow chart depicting a set of functions that can be employed in the network shown in FIG. 1.

Referring now to FIG. 2, a flow chart is provided to illustrate a set of functions that could be employed within the arrangement shown in FIG. 1. As shown in FIG. 2, at block 40, communication system 12 receives a request from a first mobile subscriber to notify a second mobile subscriber of the first mobile subscriber's location. The request itself (or the first mobile subscriber) might identify the second mobile subscriber. Alternatively, the communication system may identify the second mobile subscriber by reference to a predefined grouping associated with the first mobile subscriber.

At block 42, the communication system responsively makes a determination that the first mobile subscriber and the second mobile subscriber are located in (e.g., operating in) a common zone (i.e., in the same zone as each other). In turn, at block 44, in response to the determination, the communication system 12 sends a message to the second mobile subscriber, indicating the location of the first mobile subscriber. As noted above, the indication of location is preferably an indication of proximity, such as that the first mobile subscriber is "nearby" or "here." However, as further noted above, the indication can alternatively (or additionally) be a more specific indication of location, such as a specific street address, a map graphic, geographic coordinates, a particular subnet, or a compass heading and distance.

At block 46, the communication system may then receive a reply from the second mobile subscriber, acknowledging that the second mobile subscriber received the location-reporting message. In response to the reply, at block 48, the communication system may then send a message to the first mobile subscriber, indicating the second mobile subscriber's acknowledgement and/or indicating the second mobile subscriber's location. This message may be referred to as a location-reporting reply message. As with the first mobile subscriber's location, the second mobile subscriber's location would preferably be reported as an indication of proximity, but it could also or instead be reported as a more specific indication of location.

Thus, referring to FIG. 1, for instance, the communication system 12 might receive a request from subscriber terminal A to report subscriber terminal A's location to subscriber terminal B. The communication system may then determine that subscriber terminal B is located in the same zone as subscriber terminal A, namely zone 16. Consequently, the communication system may send a location-reporting message to subscriber terminal B, indicating subscriber terminal A's location. For instance, the location-reporting message might be presented as a communication by terminal A, stating "I am nearby", "I am here" or the like.

In turn, subscriber terminal B might send an acknowledgement to the communication system, and the communication system may responsively send an acknowledgement message to subscriber terminal A, indicating that subscriber terminal B is also nearby. For instance, the acknowledgement message might similarly be presented as a communication by terminal B, stating, "I am nearby too", "I am here too" or the like.

As another example, the communication system might receive a request from subscriber terminal A to report subscriber terminal A's location to a group that happens to comprise subscriber terminals B-H. For instance, subscriber terminal A might ask the communication system to report subscriber terminal A's location to all subscribers listed in a predefined group (e.g., buddy list, personal address book, etc.) associated with subscriber terminal A (or with a user of subscriber terminal A).

In response, the communication system would determine that subscriber terminals B and C are in the same zone as subscriber terminal A (namely, zone 16). Therefore, the communication system would report subscriber terminal A's location, respectively, to subscriber terminals B and C. However, the communication system would also determine that subscriber terminals D-H are in zones other than the zone in which subscriber terminal A is located. Consequently, the communication system would not report subscriber terminal A's location to those other subscriber terminals D-H.

Figure 3:
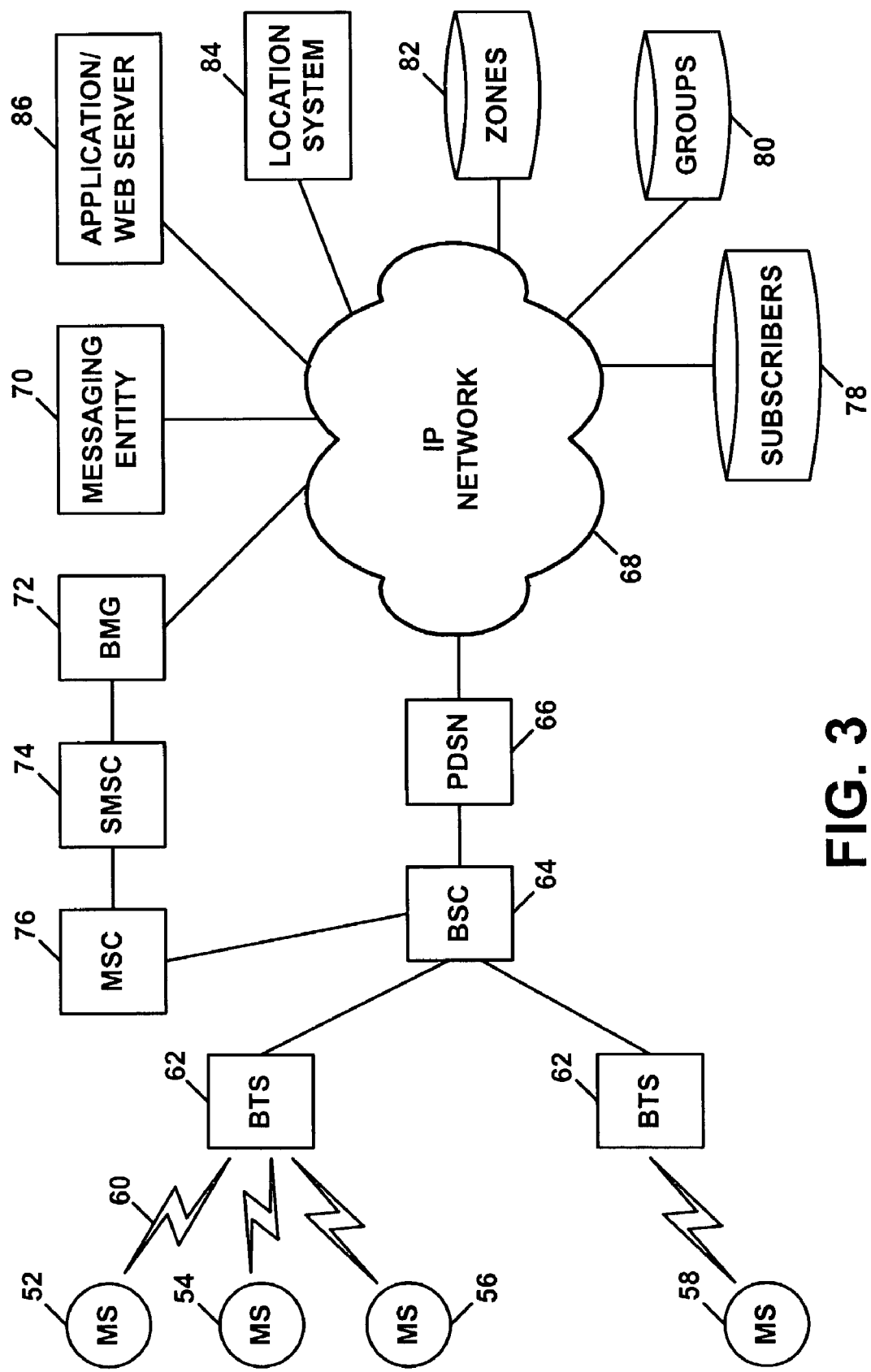
FIG. 3 is a more detailed block diagram of a network arranged in accordance with the exemplary embodiment.

The arrangement shown in FIG. 1 is representative of many possible communication networks. Referring now to FIG. 3, an example of one such communication network is shown in more detail. The network shown in FIG. 3 includes a plurality of subscriber terminals, of which four are shown, designated by reference numerals 52, 54, 56 and 58.

In this example, each subscriber terminal is a 3G mobile station (MS), such as a handheld PCS or cellular communication station, which is capable of engaging in IP communications. Each MS communicates via an air interface 60 with a base transceiver station (BTS) 62, which provides connectivity to a base station controller (BSC) 64. The BSC in turn provides connectivity with a packet data serving node (PDSN) 66, which functions as a gateway to a public or private IP network 68 such as the Internet.

Further, each MS is equipped with a microbrowser, such as the Openwave Mobile Browser available from Openwave Systems, Inc. As such, each MS can support communications with web servers on an IP network, likely through a gateway that converts HTML pages to a form suitable for display by the microbrowser.

For example, the microbrowser might interpret tag-based XML documents, such as HDML (handheld device markup language) or WML (wireless markup language) "cards" (or decks thereof), sent from a web server or other entity. Each tag-based document will typically be defined by a set of source code that includes tags to which the microbrowser is programmed to respond. For instance, the tags may direct the microbrowser to display a block of text on a display screen of the MS, or to otherwise present media to a user. Further, the tags might define hyperlinks, which, when selected by a user, would cause the microbrowser to request and download additional content from a designated site.

In the exemplary embodiment, each MS is further programmed with logic to be able to receive short message service (SMS) messages, as defined by industry standard IS-637A (promulgated by the Telecommunications Industry Association (TIA)/Electronics Industry Association (EIA)). According to this standard, an entity can send an SMS message to a given MS by sending the message to a bulk message gateway (BMG), which forwards the message in turn to a short message service center (SMSC). By querying an HLR, the SMSC then determines which mobile switching center (MSC) is currently serving the destination MS and then forwards the SMS message to that MSC. The MSC then sends the SMS message via a BSC 64 and BTS to the MS. The MS then alerts a user of the new message and may display the message to the user.

As shown in FIG. 3, for instance, a messaging entity 70 on IP network 68 may send an SMS message destined for receipt MS 52. To do so, according to IS-637A, it may send the message to a BMG 72, which would then forward the message to an SMSC 74. (Alternatively, message server 70 may send the message directly to SMSC 74). SMSC 74 would then determine that MS 52 is currently served by a particular MSC 76. Therefore, SMSC 74 would forward the SMS message to MSC 76. MSC 76 would then transmit the message, via BSC 64, BTS 62 and air interface 60, to MS 52. Upon receipt of the message, MS 52 might then display a new-message indicator, which, when selected by a user, may cause the SMS-logic of MS 52 to display the text message to the user. Other arrangements are also possible.

Still further, each MS is preferably programmed with an IM client application, such as a "NetAlert"-type application in a WAP client, which allows the MS to receive and respond to tag-based documents, such as HDML or WML cards, encapsulated in SMS messages. In particular, an SMS message might carry a tag-based document as its payload and may include a flag in its header indicating that it is a "NetAlert"-type SMS message. When the MS receives the SMS message and seeks to display the message, it may detect the NetAlert flag and may responsively invoke the microbrowser application to present the tag-based document. The tag-based document may, for instance, set out a hyperlink that a user can then select so as to cause the microbrowser to retrieve and present other content, as described above.

Thus, in the arrangement of FIG. 3, for instance, messaging entity 70 might send to MS 52 a NetAlert-type SMS message that provides MS 52 with a hyperlink to a designated web site on IP network 68. Messaging entity 70 might do so by encapsulating in an SMS message an HDML or WML card that defines the hyperlink, and then sending that SMS message to MS 52 as described above. Upon receipt, MS 52 may then alert a user and, when instructed by the user (or automatically) cause the microbrowser application to display the card. The user may then select the hyperlink so as to cause MS 52 to retrieve and display a card from the designated site.

FIG. 3 depicts a plurality of entities connected with or sitting as nodes on IP network 68. It should be understood that each of these entities represents a function within the exemplary network. As such, the entities could take various forms and could be combined together or distributed in various ways (e.g., made up of a number of components) as desired. Further, some of the entities could be omitted, and others could be added.

Still further, any of these or other entities that are described herein as carrying out a particular function could include a processor and data storage holding an appropriate set of program instructions (e.g., machine language instructions) executable by the processor to carry out that function. Alternatively or additionally, such entities could include hardware and/or firmware for carrying out various functions described. Still further, it should be understood that some or all of the entities shown on network 68 could instead be on discrete networks or arranged in other locations.

Three of the entities shown on IP network 68 are data stores. These are a subscriber data store 78, a group data store 80 and a zone data store 82. These data stores could all be combined into a single data store or could be distributed and/or integrated into one or more other entities, whether or not shown. Each data store can also take various forms. For instance, a data store could be a list or table of data or a more complex relational database or directory structure, stored in a data storage medium such as computer memory or magnetic or optical disk drive.

The subscriber data store 78 preferably indicates information about subscribers, such as mobile stations 52-58 and/or users associated with the stations. According to the exemplary embodiment, the subscriber data store can define, respectively for each subscriber, (i) a subscriber ID and (ii) one or more rules for blocking location-reporting messages, as well as other service qualification information.

The subscriber ID can take various forms. For instance, it could be a device ID such as a mobile identification number (MIN) or an encrypted MN (EMIN) and/or a user ID such as a network address identifier (NAI) or buddy name (as an alias for an ID). If the subscriber ID provides a user ID, the subscriber data store may also include a password, for use in authenticating the subscriber if desired.

With respect to a given mobile station, the rules for blocking location-reporting messages can also take various forms. For example, a rule can recite a subscriber ID, indicative of a subscriber whose location should not be reported to the mobile station. Thus, for instance, the subscriber data store may include a record keyed to MS 52, which lists a subscriber ID (e.g., MIN) of MS 56. A suitably programmed entity might interpret that record to mean that the location of MS 56 should not be reported to MS 52.

As another example, a rule can recite a group of subscriber IDs, indicating that the location of any subscriber in the group should not be reported to the mobile station. For instance, the subscriber data store may include a record keyed to MS 52, which indicates "ALL". A suitably programmed entity might interpret that record to mean that no location-reporting messages (as defined herein) should be sent to MS 52 (i.e., location-reporting from all other subscribers is blocked). Other examples are also possible.

The group data store 80 preferably indicates predefined groups of subscribers, which can be used to identify one or more subscribers to whom a given subscriber's location should be reported. As such, the group data store 80 might logically tie together the given subscriber's ID together with one or more other subscriber IDs. That way, a query keyed to the given subscriber's ID could produce a list of the one or more other subscriber IDs in the given subscriber's group.

The groups defined by the group data store might be provisioned in advance specifically to facilitate operation of the exemplary embodiment. Alternatively, the groups may already exist for some other reason. For example, some or all of the groups can be "buddy lists," of the type commonly maintained to facilitate instant messaging and other such communications. A web-based provisioning interface can be provide, to enable users to provision their group lists if desired.

For example, the group data store may indicate that the group of subscribers associated with MS 52 comprises MS 54, MS 56 and MS 58. Alternatively, the group data store might indicate that the group of subscribers associated of MS 52 comprises users of MS 54, MS 56 and MS 58. Other examples are also possible.

The zone data store 82, in turn, preferably defines zones, such as zones 16, 18 and 20 of FIG. 1. Because a zone can be defined in various ways, the information contained in the zone data store 74, may take various forms as well. As an example, if zones are defined as cells or sectors of a wireless communication system, the zone data store might list the available cells and sectors. And as another example, if zones are defined as geographic locations (e.g., bounded by particular geographic coordinates), the zone data store might correlate particular geographic coordinates to a given zone.

Another entity on network 68 is a location system 84. In the exemplary embodiment, the location system functions to determine and/or report the location of subscriber terminals, such as mobile stations 52-58. As such, the location system could take a variety of forms. For example, the location system could comprise a mobile position center (MPC) and a position determining entity as defined by J-STD-036.

The MPC can generally be a database application executed on a service control point and can function to store locations of a mobile station. The PDE, in turn, can be any system for determining the location of mobile stations. As an example, the PDE might be a network-based location-determination system, such as an HLR that maintains a record of the cell and sector in which each mobile station is operating, or a triangularization system that determines where a mobile station is located based on a comparison of relative signal strength from several measuring points. Alternatively or additionally, the PDE might be a handset-based (or, more generally, subscriber based) position determining system, such as a GPS receiver in a mobile station. In that event, a mechanism would preferably be provided to facilitate communication of location information between the handset and other network entities. Such a mechanism is defined by industry standard TIA/EIA/IS-801, the entirety of which is hereby incorporated by reference.

In the exemplary embodiment, the MPC would then collect the location of each subscriber terminal, as determined by the PDE. In turn, one or more other entities on network 68 could query the MPC to determine the location of a given subscriber terminal, and the MPC can report the requested location. In the exemplary embodiment, the location reported by the MPC could be an indication of which zone the subscriber terminal is located in at the moment (or, equivalently, as last determined). In this regard, the location itself might be the zone (such as if the location is a cell and/or sector for instance). Or the MPC or other entity (e.g., the querying entity) could translate the location information provided by the MPC into a zone.

Alternatively, an entity on network 68 could query the MPC, an HLR, or a VLR (visitor location register) to obtain a list of all subscriber terminals that are located in a given zone (such as all subscriber terminals in a particular cell sector). The entity can then query that list to determine if given subscriber terminal is located in that zone.

Still another entity on IP network 68 is an application/web server 86, which, in this example, provides the core intelligence of communication system 12. In particular, server 86 preferably receives location-reporting requests and, if appropriate, sends location-reporting messages, or causes location-reporting messages to be sent, to receiving subscribers. Additionally, server 86 preferably receives acknowledgements from receiving subscribers and responsively sends location-reporting messages, or causes location-reporting messages to be sent, to requesting subscribers, as described above.

Server 86 may receive location-reporting requests in any manner. One way for it to do so, for instance, is to function as a web server with respect to a requesting MS. For example, server 86 may maintain or have access to an HDML or WML card that prompts a user to submit the request. A user at an MS may thus browse to that card (i.e., direct a browser to retrieve and display the card) and, through interaction with the card, submit the location-reporting request. For example, the card might be a WML "choice card," that defines a "broadcast location" choice, which, when selected by a user, causes the microbrowser to send a predetermined response code to server 86. Server 86 may treat that predetermined response code as a request to report the location of the MS to everyone in a predefined group associated with the user.

Upon receipt of a location-reporting request like this, server 86 may thus identify one or more subscribers associated with the requesting subscriber, i.e., one or more subscribers to whom the requesting subscriber's location should be reported. To do so, server 86 may programmatically query the group data store 80 to find all subscribers associated with the requesting subscriber, such as all subscriber's on the requesting subscriber's buddy list for instance.

According to the exemplary embodiment, server 86 then includes program logic to determine, with respect to each subscriber in the group, whether the subscriber is in the same zone as the requesting subscriber. To do so, with respect to the requesting subscriber and with respect to each subscriber in the group, server 86 preferably queries location system 84 to identify the subscriber's current (or last known) location. To the extent the location information provided by location system 84 does not indicate a zone, server 86 may then query the zone data store 84 to determine which zone encompasses the location. For each receiving subscriber, server 86 then determines if the zone of the receiving subscriber matches the zone of the requesting subscriber.

Alternatively, if the zone is defined with respect to the requesting subscriber, such as an area covering a predefined distance from the requesting subscriber, server 86 can determine if the receiving subscriber falls within that predefined distance. For instance, server 86 can compute the Euclidian distance between the location coordinates of the requesting subscriber and the location coordinates of the receiving subscriber. If the distance is less than or equal to a predefined threshold distance, server 86 can conclude that the receiving subscriber is in the same zone as the requesting subscriber.

Note that this process will work best if the locations of the requesting subscriber and receiving subscriber are know with sufficient granularity, such as with specific latitude/longitude location coordinates.

Additionally, server 86 preferably includes logic to determine, with respect to each subscriber in the group (or with respect to each such receiving subscriber that is in the same zone as the requesting subscriber, depending on the order in which the method steps are carried out), whether a location-reporting message to the subscriber is blocked. To do so, with respect to a given receiving subscriber, server 86 may query the subscriber data store 78 in search of a rule indicating that the requesting subscriber's location should not be reported to the receiving subscriber. Alternatively, server 86 may query the group data store 80 to determine if the requesting subscriber is not listed in the receiving subscriber's group list (e.g., buddy list). If reporting of the requesting subscriber's location to the receiving subscriber is blocked, server 86 can effectively exclude the receiving subscriber from the group (i.e., treat the receiving subscriber as not being a member of the group).

In turn, server 86 preferably includes logic to send location-reporting messages, or cause location-reporting messages to be sent to each receiving in the same zone as the requesting subscriber, and as to which the location-reporting is not blocked. As noted above, the location-reporting message will preferably identify the requesting subscriber (e.g., by user name) and provide an indication of proximity, such as an indication that the requesting subscriber is "here", "nearby" or the like. This may reflect the fact that the requesting subscriber is in the same zone as the receiving subscriber.

However, as further noted, the location-reporting message can also, or alternatively, include a more specific indication of the requesting subscriber's location. For example, if the server has identified location coordinates of the requesting subscriber, the server can specify those location coordinates in the location-reporting message. As another example, provided with location coordinates of both the requesting subscriber and the receiving subscriber, the server can (itself, or with the help of a suitable mapping program) determine the compass heading reflecting the direction from the receiving subscriber to the requesting subscriber and/or the distance between the receiving subscriber and the requesting subscriber. The server can then specify the compass heading and/or distance between in the location-reporting message.

As still another example, provided with the location coordinates of the requesting subscriber (for instance), the server can (again itself, or with the help of a suitable mapping program) generate a map graphic illustrating where the requesting subscriber is located. Provided that the location-reporting message supports graphic media, the server may then include the map graphic in the location-reporting message.

And as still another example, if the location system does not provide the server with an indication of street address or establishment where the requesting subscriber is located, the server may (also itself, or with the help of a mapping program) translate the requesting subscriber's location into a street address or establishment at that location. The server may then include that street address or establishment in the location-reporting message. Other examples are possible as well.

The server may be programmed to send the location-reporting message, or (equivalently) cause the message to be sent, in a variety of ways. For example, server 86 may itself send to the receiving subscriber an SMS message carrying the location-reporting message as payload. The location-reporting message may then be displayed to the user as the text of the SMS message. As another example, server 86 may direct messaging server 70 to send to the receiving subscriber a NetAlert-type SMS message, which provides a hyperlink back to an WML card maintained by server 86. That WML card may, in turn, be encoded with the location-reporting message, so as to facilitate display of the location-reporting message by a microbrowser. And as still another example, the server may be programmed to send the location-reporting message as an e-mail message to the receiving subscriber, provided that the receiving subscriber is configured to be able to receive e-mail messages.

In the exemplary embodiment, the locating-reporting message will include a mechanism to allow the receiving subscriber to readily reply to the location-reporting message. For example, if the location-reporting message is sent as a basic SMS message to the MIN of the receiving MS, it could include a "callback number" of server 86, i.e., a telephone number of server 86. A user at the receiving MS can direct the MS to initiate a call to that callback number. When server 86 receives the call, it can then determine the calling station's MIN (through normal caller identification procedures) and match that MIN to the MIN to which the SMS message was sent. Given that match, the server 86 can treat the call as an acknowledgement from the receiving MS.

As another example, if the location-reporting message is provided as an WML card (resulting from a NetAlert message, for instance), the WML card can include a hyperlink that a user can select so as to reply to server 86. In particular, the card can be programmed with a "reply" link, which, when selected by a user, would cause the microbrowser on the MS to send a predefined control signal to server 86. Server 86 may then programmatically treat that predefined control signal as an acknowledgement from the MS.

In response to each such acknowledgement, server 86 is preferably programmed to send a location reporting message to the requesting subscriber. The location-reporting message will preferably identify the receiving subscriber (e.g., by user name) and will report to the requesting subscriber that the receiving subscriber is also "nearby" or "here." In addition, or alternatively, message may indicate the receiving subscriber's location more specifically.

Finally, if the server has send location-reporting messages to multiple receiving subscribers for a given requesting subscriber, the server may be programmed to wait for a set time period to receive acknowledgements from all of those receiving subscribers. The server may then send a single message to the requesting subscriber, at once reporting the proximity or particular locations of all of the receiving subscribers.

According to another aspect of the exemplary embodiment, a subscriber terminal may be programmed with an application that functions to track the age of location-reporting messages. When the terminal receives a location reporting message indicating that a subscriber is in a given location or area, the tracking-application can store a timestamp for the message. Based on a comparison of that timestamp to a current time of day, the tracking-application can determine how old the location report is and can inform a subscriber accordingly.

For example, the tracking-application might display a buddy list (or other subscriber list) and provide next to each buddy a pie-chart icon. When the terminal receives a location-reporting message indicating location of the one of the buddies on the list, the pie-chart icon will be a full circle. Every fifteen minutes, the tracking-application might then clear out a quarter of the pie chart, until the pie is empty an hour later, indicating that the location report may be stale. Other arrangements are possible as well.

Figure 4:
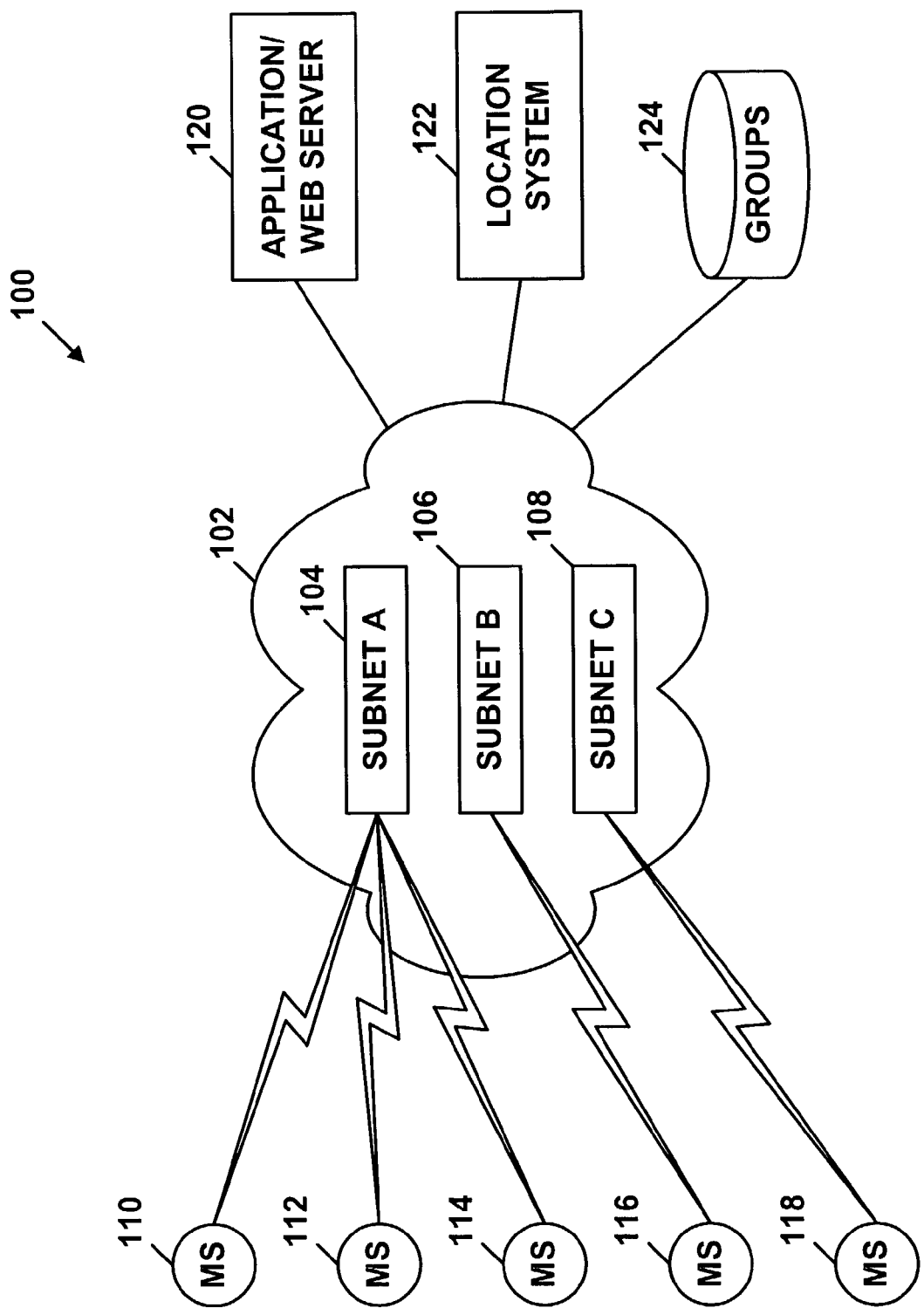
FIG. 4 is a block diagram of an alternative network arrangement in accordance with the exemplary embodiment.

As mentioned previously, the zone could also be defined as a subnet of a network. FIG. 4 is a block diagram of an alternative network arrangement 100 in which the zone is defined as a subnet.

As shown in FIG. 4, an IP network 102 may be split into a plurality of subnets 104, 106, 108. While three subnets are depicted in FIG. 4, the number of subnets may vary based on the class of network, the user demands on the network, or other factors. Further, the subnets 104, 106, 108 are shown in FIG. 4 as being located on a single network 102 for the sake of simplicity. However, the subnets may be located on different networks. Additionally, while FIG. 4 depicts the network 102 as an IP network, the network 102 may be any packet-based network.

One or more subscriber terminals can be on a particular subnet. As depicted in FIG. 4, five subscriber terminals 110-118 are on various subnets A-C. The subscriber terminals can be, for example, a 3G mobile station (MS), such as a handheld PCS or cellular communication station that is capable of engaging in IP communications. As shown in FIG. 4, MS 110, MS 112, and MS 114 are on Subnet A 104; MS 116 is on Subnet B 106; and MS 118 is on Subnet C 108. Of course, greater or fewer number of subscriber terminals can be on a subnet.

While, FIG. 4 shows a direct connection from a subscriber terminal to a subnet, there may be one or more entities, such as a BTS, a BSC, and a PDSN, connected between the subscriber terminal and the subnet as shown in FIG. 3. The links between the subscriber terminal, the subnet, and the other entities, if any, may be wired or wireless connections.

As mentioned previously, an MS can ask an application/web server to report the location of the MS to all subscriber terminals listed in a predefined group (e.g., buddy list, personal address book, etc.) associated with MS (or with a user of MS). For example, MS 110 can ask the application/web server 120 to report the location of MS 110 to the subscriber terminals in MS 110's buddy list. In yet another example, the server 120 might receive a request from MS 110 to report MS 110's location to the members of a group comprised of MS 112-118. The server 120 may function substantially the same as the server 86 as shown in FIG. 3.

In response to a request to report to a predefined group, the server 120 may query a group data store 124 to identify which subscriber terminals are listed in the predefined group associated with the requesting subscriber terminal. For example, the server 120 may query the group data store 124 and in response, the group data store 124 may inform the server 120 that MS 112, MS 114, and MS 116 are in MS 110's buddy list. The group data store 124 may be substantially the same as the group data store 80 as shown in FIG. 3.

Once the server 120 has identified the receiving subscriber terminals, either from the group data store 124 or directly from the requesting subscriber terminal, the server 120 may then determine which of the receiving subscriber terminals are on the same subnet as the requesting subscriber terminal. To do so, the server 120 may query a location system 122 that is operable to determine who is on a network. The location system 122 may function substantially the same as location system 84 as shown in FIG. 3.

The location system 122 may include presence technology. Presence technology is technology that allows for locating and identifying a device when it connects to a network. Presence technology may be used in a variety of applications, including, but not limited to, instant messaging. The presence technology may trigger or poll the HLR for presence information. As an example, the location system may include presence technology similar to dynamicsoft's Presence Engine, which is designed to provide real-time presence information. Other presence technology may also be included in the location system 122.

In response to the query by the server 120, the location system 122 may use the presence technology to identify the Mobile IP addresses of the receiving subscriber terminals. The location system 122 may then provide the Mobile W addresses of the receiving subscriber terminals to the server 120.

Using the Mobile IP addresses, the server 120 may determine the subnet addresses on which the receiving subscriber terminals are located using a variety of different mechanisms. For example, the server 120 may run a software utility to determine on which subnet the receiving subscriber terminals are located, if any. The server 120 may compare the subnet addresses on which the receiving subscriber terminals are located with the subnet address on which the requesting subscriber terminal is located. With this comparison, the server 120 can make a determination of whether a receiving subscriber terminal is on a subnet in common with the requesting subscriber terminal.

"Traceroute" is an example of a software utility that may be used to identify the subnet on which a receiving subscriber terminal is located. Traceroute is a network utility that records the route that data travels between computers. For example, Windows comes with its own Traceroute utility (TRACERT.EXE) that can be executed from a command line. The server 120 may use the recorded route information obtained from Traceroute to determine that data sent to a receiving subscriber terminal was routed to a particular subnet. Alternatively, the location system 122 may run Traceroute and provide the server 120 with information regarding which receiving subscriber terminals are on the same subnet as the requesting subscriber terminal.

In this example, the server 120 would determine that MS 112 and MS 114 are on the same subnet as MS 110. This determination indicates proximity of MS 110 to MS 112 and MS 114. For example, MS 110, MS 112, and MS 114 may be located in the same portion of a metropolitan area, in the same cell sector, or other common location depending on how the network was divided into subnets.

The server 120 then sends MS 112 and MS 114 a location-reporting message indicating MS 110's location. The location-reporting message may be sent in a variety of formats, such as an SMS message, a NetAlert message, or in a XML card, as previously described with reference to FIG. 3. The location-reporting message may include the subnet address. As another example, the location-reporting message may include specific latitude/longitude coordinates, address, identity of an establishment, map, and/or a compass heading and distance indicating the location of MS 110. In yet another example, the location-reporting message may state, "I am nearby," "I am here," or the like.

Additionally, the server 120 would determine that MS 116 and MS 118 are not on the same subnet as MS 110. Consequently, the server 120 would not report MS 110's location to MS 116 and MS 118. Further, if MS 110 specified a predefined group in the location-reporting request, the server 120 would not report MS 110's location to a subscriber terminal not in the predefined group, even if the subscriber terminal was on the same subnet as MS 110. Still further, the server 120 would not report MS 110's location to a receiving subscriber terminal that had blocked location-reporting messages from MS 110. The receiving subscriber terminal may block a message from MS 110 using the same methods as previously described with reference to FIG. 3.

As previously described with reference to FIG. 2, the receiving subscriber terminal may reply to the server 120 after receiving the location-reporting message. The reply may acknowledge that the receiving subscriber terminal received the location-reporting message. In response to the reply, the server 120 may then send a location-reporting reply message to the requesting subscriber terminal, indicating the receiving subscriber terminal's acknowledgement and/or indicating the receiving subscriber terminal's location. The location-reporting reply message indicates a proximity of the receiving subscriber terminal to the requesting subscriber terminal.

An exemplary embodiment of the present invention has been described above. Those skilled in the art will understand, however, that changes and modifications may be made to this embodiment without departing from the true scope and spirit of the present invention, which is defined by the claims.

We claim:

1. A location-reporting method comprising: receiving a location-reporting request from a first mobile subscriber; responsive to the request, making a determination that a second mobile subscriber is on a subnet in common with the first mobile subscriber; and
responsive to the determination, sending a location-reporting message to the second mobile subscriber, the location-reporting message indicating a location of the first mobile subscriber that is proximate to a location of the second mobile subscriber.

2. The location-reporting method of claim 1, wherein making a determination that the second mobile subscriber is on a subnet in common with the first mobile subscriber comprises:
identifying a Mobile IP address of the second mobile subscriber; and
running a software utility to determine the subnet on which the second mobile subscriber is located.

3. The location-reporting method of claim 2, wherein identifying the Mobile IP address of the second mobile subscriber comprises querying a location system.

4. The location-reporting method of claim 3, wherein the location system includes presence technology.

5. The location-reporting method of claim 2, wherein the software utility is Traceroute.

6. The location-reporting method of claim 1, further comprising:
in response to the request, querying a group data store to identify the second mobile subscriber.

7. The location-reporting method of claim 6, wherein querying a group data store to identify the second mobile subscriber comprises identifying one or more mobile subscribers defining a group associated with the first mobile subscriber, the second mobile subscriber being a member of the group.

8. The location-reporting method of claim 7, wherein the group is an instant messaging buddy list established for the first subscriber.

9. The location-reporting method of claim 7, wherein the group is an address book established for the first subscriber.

10. The location-reporting method of claim 1, further comprising:
receiving a reply from the second mobile subscriber, after sending the location-reporting message to the second mobile subscriber; and
in response to the reply, sending a location-reporting reply message to the first mobile subscriber, the location-reporting reply message indicating a location of the second mobile subscriber.

11. The location-reporting method of claim 10, wherein the location-reporting reply message indicates a proximity of the second mobile subscriber to the first mobile subscriber.

12. The location-reporting method of claim 1, wherein sending the location-reporting message to the second mobile subscriber comprises:
   sending the location-reporting message as text in an SMS message to the second mobile subscriber.

13. The location-reporting method of claim 1, wherein sending the location-reporting message to the second mobile subscriber comprises:
   sending a NetAlert message to the second mobile subscriber, the NetAlert message providing the second mobile subscriber with a link to a web site bearing the location-reporting message.

14. The location-reporting method of claim 1, wherein sending the location-reporting message to the second mobile subscriber comprises:
   sending the location-reporting message to the second mobile subscriber in an XML card.

15. The method of claim 14, wherein the XML card is a choice card that includes a choice item selectable by a user to reply to the location-reporting message.

16. A location-reporting method comprising: receiving a location-reporting request from a first mobile subscriber, the location-reporting request reflecting a request to report a location of the first mobile subscriber to at least a second mobile subscriber; making a determination of whether reporting of the first mobile subscriber's location to the second mobile subscriber is blocked; and if the determination is that reporting of the first mobile subscriber's location to the second mobile subscriber is not blocked, then reporting the first mobile subscriber's location that is proximate to a location of the second mobile subscriber to the second mobile subscriber provided that the second mobile subscriber is on a subnet in common with the first mobile subscriber.

17. The location-reporting method of claim 16, wherein making a determination of whether reporting of the first mobile subscriber's location to the second mobile subscriber is blocked comprises determining whether a rule is set for the second mobile subscriber indicating that reporting of the first mobile subscriber's location to the second mobile subscriber's location is blocked.

18. The location-reporting method of claim 16, wherein making a determination of whether reporting of the first mobile subscriber's location to the second mobile subscriber is blocked comprises determining whether the first mobile subscriber is included in a buddy list established for the second mobile subscriber,
   wherein reporting of the first mobile subscriber's location to the second mobile subscriber's location is blocked if the first mobile subscriber is not included in the buddy list established for the second mobile subscriber.

19. A location-reporting method comprising: receiving from a first mobile subscriber a request to report the first mobile subscriber's location; responsive to the request, identifying a group of mobile subscribers associated with the first mobile subscriber; with respect to each mobile subscriber in the group, determining whether the mobile subscriber is on a subnet in common with the first mobile subscriber and, if so, sending a location-reporting message to the mobile subscriber, the location-reporting message indicating a location of the first mobile subscriber that is proximate to a location of the second mobile subscriber; receiving from at least a given mobile subscriber in the group a reply to the location-reporting message; and responsive to the reply, sending to first mobile subscriber a location-reporting reply message indicating a location of the given mobile subscriber.

20. The location-reporting method of claim 19, wherein identifying a group of mobile subscribers associated with the first mobile subscriber comprises:
   querying a data store to identify the group of mobile subscribers; and
   excluding from the group any mobile subscriber to which reporting of the first mobile subscriber's location is blocked.

21. A system comprising: a processor; data storage; and instructions stored in the data storage and executable by the processor in response to a location-reporting request from a first mobile subscriber, to: make a determination that a second mobile subscriber is on a subnet in common with the first mobile subscriber; and responsive to the determination, send a location-reporting message to the second mobile subscriber, the location-reporting message indicating a location of the first mobile subscriber that is proximate to a location of the second mobile subscriber.

* * * * *